Oct. 29, 1957  W. R. WOOLRICH, JR  2,811,361
GAME BOARD
Filed Feb. 3, 1954

INVENTOR
WILLIS RAYMOND WOOLRICH, JR.
BY Henry H. Snelling
ATTORNEY

United States Patent Office 2,811,361
Patented Oct. 29, 1957

2,811,361

GAME BOARD

Willis Raymond Woolrich, Jr., Houston, Tex.

Application February 3, 1954, Serial No. 407,849

2 Claims. (Cl. 273—134)

This invention relates to games and has for its principal object the provision of a game board so divided or patterned as to represent a plan or aerial view of several city blocks of an existing city in facsimile or an imaginary city with the streets employed as the courses for the movement of the players and with one or more entrance points.

An important object of the invention is to provide a variable "Traffic Light System" of red, yellow or green "Lights." These "Traffic Light Signals" appear at the intersections of the streets to control the movement of the players in the same manner as actual traffic lights control automotive traffic. The "Traffic Light System" is controlled by chance and accomplished by spinning a "Traffic Light Disc" mounted under the playing board and pivoted to the center of the playing board.

A further object of the invention is to provide a board having like reproductions of typical existing cities, showing street names and direction arrows to indicate one-way or two-way streets. The one-way and two-way streets further control the movement of the players.

A still further object of the invention is to provide with the game board a series or deck of destination or "Taxi Fare" cards, each marked with an address coinciding with the address of one of the intersections on the playing board.

A still further object of the invention is to provide with the deck of "Fare Cards" additional cards bearing penalty or bonus instructions, such as "Flat tire, lose one turn," or "Return to taxi stand number 3," or "Tip for driver, $1.00."

A still further object of the invention is to provide a supply of facsimile paper money to be disbursed to the players as cab fare when the game board is so played as a "Taxi Business," and the destination cards represent "Taxi Fares."

Figure 1:
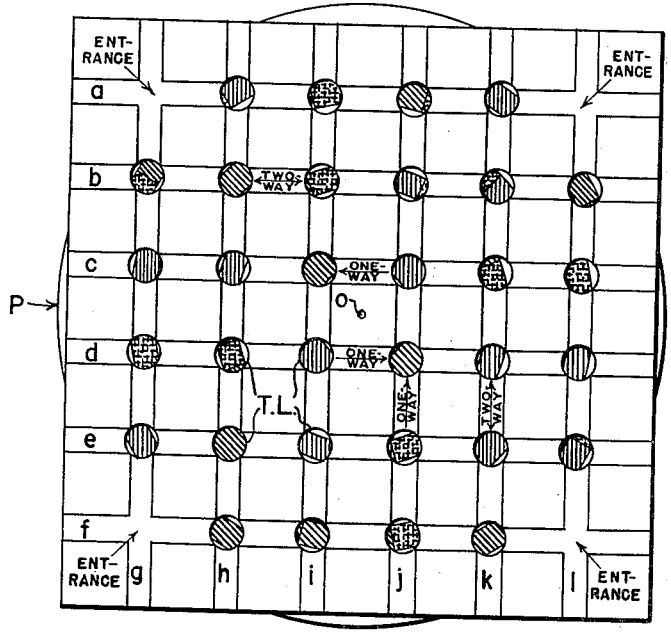
Figure 1 shows the plan view of the stationary playing board surface. Segments of the movable "Traffic Light Disc" are shown exposed at each of the four sides of the playing board.

In Figure 1, the board is illustrated as a sheet or board of a suitable material as, for example, wood, paper, plastic, fiber, glass, etc. The board is marked off in squares or mixed geometric patterns of various shapes to represent city streets. The board surface is painted or printed either in color or in black and white to represent an aerial view of the portion of a city contained on the board. The circle marked "o" in the center of the board is the pivot point for the movable "Traffic Light Disc" mounted under the playing board. The lower case letters $a, b, c, d, e, f, g, h, i, j, k$, and $l$ represent street names. The circles are openings and indicate traffic lights and four of them are so marked by the arrows from the letters T. L. The letter "P" shown with an arrow pointing toward the periphery of the movable "Traffic Light Disc" is shown at a matching position in Figure 2 for clarification.

In Figure 1, the arrows marked "Entrance" represent entrance points for the players. These points may be variously designated as: "Cab Stand Number 1, 2, 3, 4," or, "Fire Station Number 1, 2, 3, 4," or, "Ambulance Station Number, 1, 2, 3, 4", or, "Wrecker Service Station Number 1, 2, 3, 4," etc. The arrows marked "One-way" and "Two-way" represent one-way and two-way streets.

Figure 2:
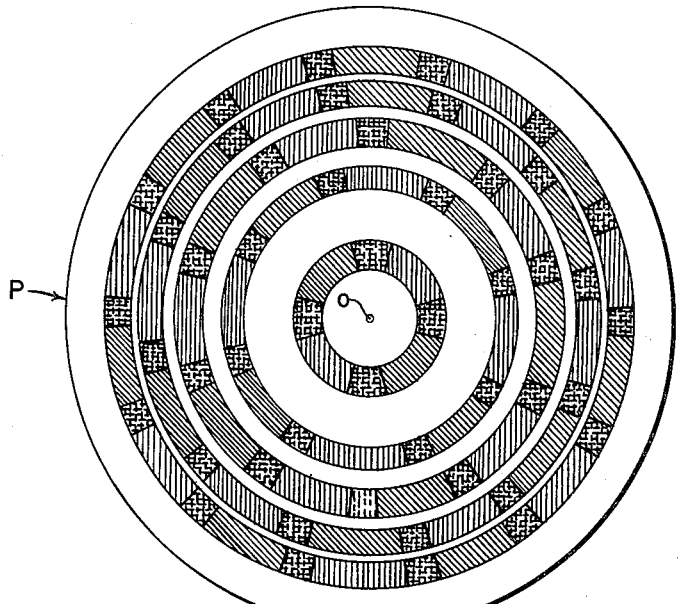
Figure 2 shows the plan view of the movable "Traffic Light Disc" which is mounted under and pivoted to the center of the stationary playing board.

In Figure 2 the "Traffic Light Disc" is illustrated as a sheet or board of a suitable material as, for example, wood, paper, plastic, fiber, glass etc. The circle marked "o" in the center of this disc is the pivot point for the disc. A brad, pin or other suitable bearing device through this hole and through the matching hole marked "o" in the playing board is provided to permit rotating the disc around the center of the stationary playing board.

In Figure 2, the concentric rings marked R, Y, G, Y, R, Y, etc are bands of color of alternate red, yellow, green, yellow, red, yellow, etc. These bands of color are so positioned on the "Traffic Light Disc" that they align under the circles shown as street intersections in Figure Number 1.

Further understanding can best be obtained from a description of the method of one form of play of the game hereafter referred to as "Taxi."

1. The game is played by two or more players.
2. Player "1" shuffles the "fare" cards and places them face down on the table. This player also keeps the money and disburses the fares or collects the penalties. The player on his left is #2.
3. Each player draws a fare card and places it face up on the table.
4. Each player selects a miniature colored taxicab.
5. Player mumber 1 spins the "Traffic Light Disc."
6. Players may start from their closest "Taxi Stand" or "Entrance" position.
7. After selecting a starting position, each player beginning with #1 moves his taxi to the address shown on his fare card, in accordance with the following rules:
8. Players may move their taxi in either direction on two-way streets but only in the one direction indicated on one-way streets, until they reach an intersection showing a red or a combination red and yellow "light." When a player can proceed no farther, the next player moves.
9. After all players have made their first move, player #2 spins the traffic light disc and all players move in turn.
10. Any time an intersection traffic light shows red, or a combination of red and yellow, a tax cannot cross the intersection, but must wait until the first spin that produces a green, yellow, or green and yellow light.
11. A taxi cannot make a U-turn.
12. When a taxi reaches its destination, the player collects a dollar fare and trades in his fare card for another from the top of the deck. The taxi starts from the intersection where the fare is collected to the address on the second fare card, after the next spin of the traffic light disc.
13. The first player to collect $15.00 in fares is the winner. The remaining players continue playing to decide second, third, etc. place winners.
14. When all fare cards in the deck are drawn before the game is completed, the discards are shuffled and re-used.

The term "opening" in the specification and claims is intended to cover equivalent structure, as for example a transparent portion of the board.

What I claim is:

1. A traffic game including a square board provided with a system of streets crossing each other with openings at street intersections, a circular traffic indicator below the board, pivoted at its center to the center of the board and of such size that its periphery extends beyond the edges of the board, said traffic indicator having thereon stop, go, and caution indications to be successively visible through said openings as the indicator is revolved to determine whether or not a player may proceed through the intersection.

2. The game of claim 1 in which the streets are equally spaced, meet each other at right angles, and extend to both opposite sides of the board, some of the streets are designated one-way streets, the stop, go, and caution indications are areas of red, green, and yellow respectively, and the board is provided with a plurality of starting stations formed by the ends of the streets at each of the four sides of the board.

References Cited in the file of this patent

UNITED STATES PATENTS

| | | |
|---|---|---|
| 739,201 | Morton | Sept. 15, 1903 |
| 1,116,012 | Casebeer | Nov. 3, 1914 |
| 1,544,515 | Branning | June 20, 1925 |
| 2,163,011 | Schaub | June 20, 1930 |
| 2,237,707 | Lazenby | Apr. 8, 1941 |